(12) United States Patent  (10) Patent No.: US 8,437,025 B2
Matsunaga  (45) Date of Patent: May 7, 2013

(54) IMAGE PROCESSING APPARATUS AND IMAGE PROCESSING METHOD

(75) Inventor: Daisuke Matsunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 12/756,745

(22) Filed: Apr. 8, 2010

(65) Prior Publication Data

US 2010/0277760 A1  Nov. 4, 2010

(30) Foreign Application Priority Data

Apr. 30, 2009 (JP) ................................ 2009-111498

(51) Int. Cl.
*G06F 3/12* (2006.01)
(52) U.S. Cl.
USPC ........ 358/1.15; 358/1.13; 358/1.14; 358/401; 358/434; 358/437; 358/443; 358/444
(58) Field of Classification Search ............ 358/1.13, 358/1.15, 1.16, 1.14, 401, 434, 437, 443, 358/444; 382/307
See application file for complete search history.

(56) References Cited

U.S. PATENT DOCUMENTS

| 6,985,246 | B2 | 1/2006 | Utsunomiya | ............... 358/1.15 |
| 7,379,201 | B2 | 5/2008 | Utsunomiya | ............... 358/1.15 |
| 7,945,125 | B2 * | 5/2011 | Tone | ........................... 382/307 |
| 7,995,223 | B2 * | 8/2011 | Arai | ............................. 358/1.13 |

FOREIGN PATENT DOCUMENTS

JP  2002-008002  1/2002
JP  2002-281293  9/2002

\* cited by examiner

*Primary Examiner* — Vu B Hang
(74) *Attorney, Agent, or Firm* — Fitzpatrick, Cella, Harper & Scinto

(57) ABSTRACT

In an image processing apparatus includes a plurality of image processing units which perform image processing for image data, a packet data containing part of image data and an identifier for identifying an image processing unit is generated. When image processing to be executed by a specific image processing unit identified based on the identifier is switched to another image processing, an image processing unit which has received packet data changes the identifier contained in the packet data, and transfers the packet data containing the changed identifier to another image processing unit.

4 Claims, 16 Drawing Sheets

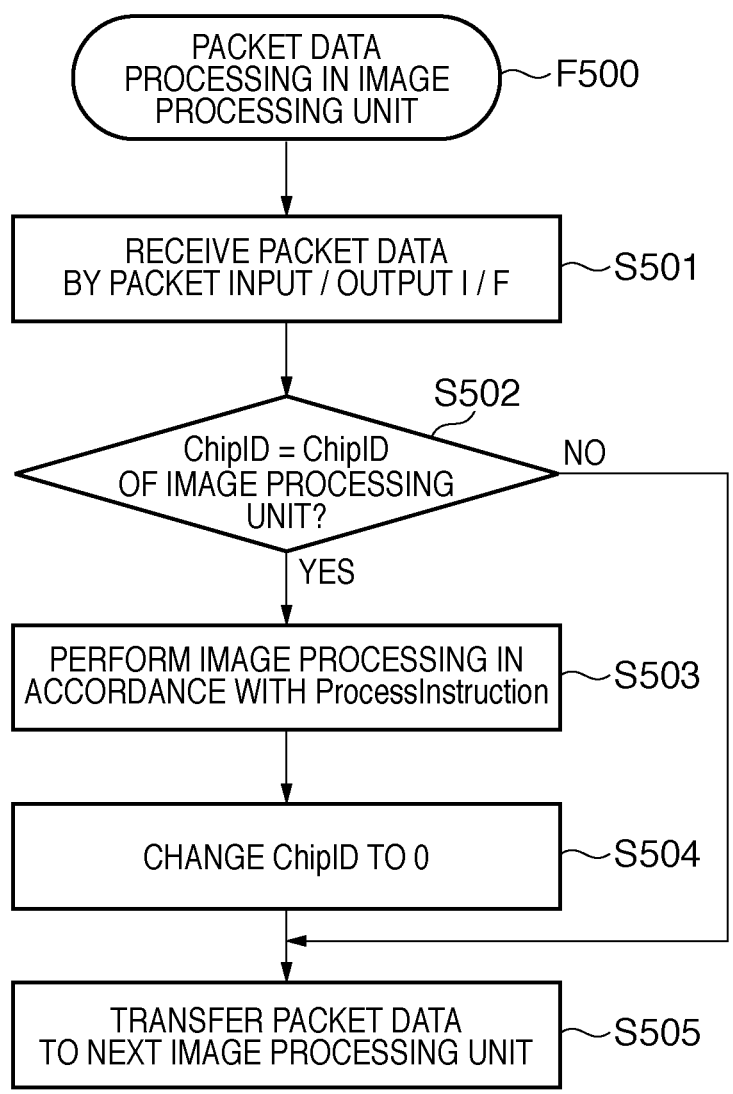

F I G. 12

1200

| Adress 0 | Data 0 |
| --- | --- |
| Adress 1 | Data 1 |
| Adress 2 | Data 2 |
| ... | |
| Adress X | Data X |

IMAGE PROCESSING APPARATUS AND IMAGE PROCESSING METHOD

BACKGROUND OF THE INVENTION

1. Field of the Invention

The present invention relates to an image processing apparatus and an image processing method for processing image data.

2. Description of the Related Art

An image processing apparatus has conventionally been proposed, which processes packet data obtained by dividing a page image into blocks and adding header information to compressed image data of each block, in order to efficiently save the memory and parallel-execute a plurality of functions in an image processing apparatus such as an MFP (Japanese Patent Laid-Open No. 2002-008002). To reduce the load of data management/transfer control on the CPU of an image processing apparatus, there is also proposed an image processing apparatus having a packet table, a chain table, and a DMA capable of handling them, as described in Japanese Patent Laid-Open No. 2002-281293.

A system as a combination of these conventional techniques has widely been used. This system can increase the image processing speed by suppressing the load on the CPU, parallel-executing a plurality of functions, and performing parallel image processes for packet data. In this system, respective image processing units are formed from chips and the like in accordance with a plurality of image processes performed for each block image data. These chips include a chip for executing processing immediately before printer output, and a chip for executing processing immediately after scanner input.

Each chip appropriately configures an internal circuit in consideration of parallel processes and the circuit scale. For example, functions for performing specific processing are parallel-formed in respective chips. The internal configurations of some chips are switched using the scheduling function of software.

Input jobs include jobs with high priority using a printer and scanner, and those with lower priorities. When some chips are switched for a high-priority job to perform processing while a plurality of chips execute a low-priority job, software processing for scheduling by the CPU is necessary.

When switching a chip, transfer of an image from the CPU to the chip to be switched needs to be interrupted. It is also necessary to acquire and hold information (set parameters and the progress of the operation) upon the interruption. When restarting the low-priority job, restart processing needs to be done to set parameters again and resume data transfer. The load of software necessary for scheduling increases owing to the need for these processes.

SUMMARY OF THE INVENTION

An aspect of the present invention is to eliminate the above-mentioned problems with the conventional technology. The present invention provides an image processing apparatus and an image processing method for, when a function executed by a specific image processing unit among a plurality of image processing units has been switched, appropriately changing an identifier which is contained in packet data and identifies an image processing unit for executing image processing, and transferring the packet data to the proper image processing unit.

The present invention according to its first aspect provides an image processing apparatus comprising:

an input unit configured to input image data;

a plurality of image processing units configured to perform image processing for the image data input from the input unit;

a generation unit configured to generate a plurality of packet data each containing part of the image data and an identifier for identifying an image processing unit of the plurality of image processing units;

a switching unit configured to switch image processing to be executed by a specific image processing unit among the plurality of image processing units;

a transmission unit configured to transmit packet data to the specific image processing unit when the specific image processing unit is identified based on the identifier contained in the packet data generated by the generation unit; and a transfer unit configured to, when the switching unit has switched the image processing to be executed by the specific image processing unit, changes the identifier contained in the packet data transmitted by the transmission unit, and transfers the packet data containing the changed identifier to another image processing unit among the plurality of image processing units.

The present invention according to its second aspect provides an image processing method in an image processing apparatus including a plurality of image processing units which perform image processing for input image data, the method comprising:

an input step of inputting image data;

a generation step of generating a plurality of packet data each containing part of the image data and an identifier for identifying an image processing unit of the plurality of image processing units;

a switching step of switching image processing to be executed by a specific image processing unit among the plurality of image processing units;

a transmission step of transmitting packet data to the specific image processing unit when the specific image processing unit is identified based on the identifier contained in the packet data generated in the generation step; and a transfer step of, when the image processing to be executed by the specific image processing unit has been switched in the switching step, changing the identifier contained in the packet data transmitted in the transmission step, and transferring the packet data containing the changed identifier to another image processing unit among the plurality of image processing units.

According to the present invention, when a function executed by a specific image processing unit among a plurality of image processing units has been switched, an identifier which is contained in packet data and identifies an image processing unit for executing image processing can be appropriately changed to transfer the packet data to the proper image processing unit.

Further features of the present invention will become apparent from the following description of exemplary embodiments with reference to the attached drawings.

BRIEF DESCRIPTION OF THE DRAWINGS

FIG. 5 is a flowchart showing procedures to process packet data transferred to an image processing unit;

FIG. 12 is a view showing a data set when the Command is not one to switch the function;

DESCRIPTION OF THE EMBODIMENTS

Figure 1:
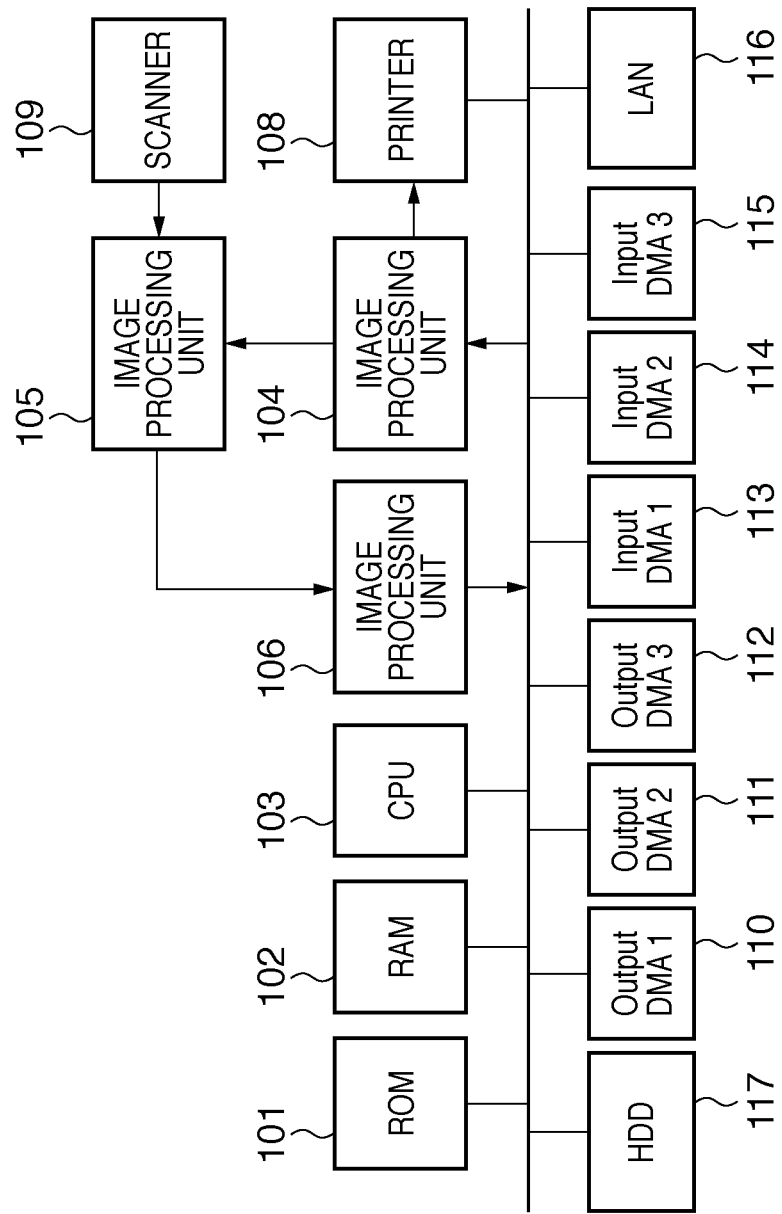
FIG. 1 is a block diagram showing the internal arrangement of an image processing apparatus according to the first embodiment of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts and a repetitive description thereof will be omitted. Building blocks necessary for the embodiments will be described first, and then details of processing will be explained.

First Embodiment

FIG. 1 is a block diagram showing the internal arrangement of an image processing apparatus according to the first embodiment of the present invention. A ROM 101 is a nonvolatile memory device which stores the boot program of a CPU 103. A RAM 102 is a volatile memory device which stores programs and image data. The CPU 103 executes programs to control a DMA, an image processing unit, and the like (to be described later). Image processing units 104 to 106 perform various image processes for a block image contained in packet data. For example, the image processing unit 104 connected to a printer 108 includes image processing preferably executed immediately before printer output, a function of converting packet data into raster data, and a decompression unit which decompresses a compressed image. These functions will be called a FuncP. The image processing unit 105 connected to a scanner 109 functioning as an input unit includes image processing preferably executed immediately after scanner input, a function of converting raster data into packet data, and a compression unit which compresses a raw image. These functions will be called a FuncS. The image processing unit 106 connected to no device includes a compression unit, a decompression unit, a packet/raster conversion function, a rotation unit, and the like in order to process packet data transferred from the RAM 102, store the processed data again in the RAM 102, and continue subsequent processing. These functions will be called a FuncL. The image processing units 104 to 106 are connected to a ring bus, and one image processing unit performs image processing in accordance with image processing information contained in the header of packet data. The detailed arrangement of the image processing units 104 to 106 will be exemplified later.

Output DMAs 110 to 112 read out packet data from a predetermined address in the RAM 102, and input it to the image processing unit 104 serving as an input port of the image processing units 104 to 106 connected to the ring bus. Input DMAs 113 to 115 write, at a predetermined address in the RAM 102, packet data output from the image processing unit 106 serving as an output port of the image processing units 104 to 106 connected to the ring bus. Of these DMAs, only the output DMAs 110 to 112 are used to output image data to the printer 108, and only the input DMAs 113 to 115 are used to input image data from the scanner 109. All the output DMAs 110 to 112 and the input DMAs 113 to 115 are used to read out data from the RAM 102, process it by the image processing units 104 to 106, and write back the processed packet data again in the RAM 102. These output DMAs and input DMAs are packet DMAs which transfer packet data in accordance with a chain table and packet table which are used generally. A LAN 116 is a network I/F for receiving image data from the outside of the system or transmitting send data. An HDD 117 is a storage device for spooling image data.

Figure 2:
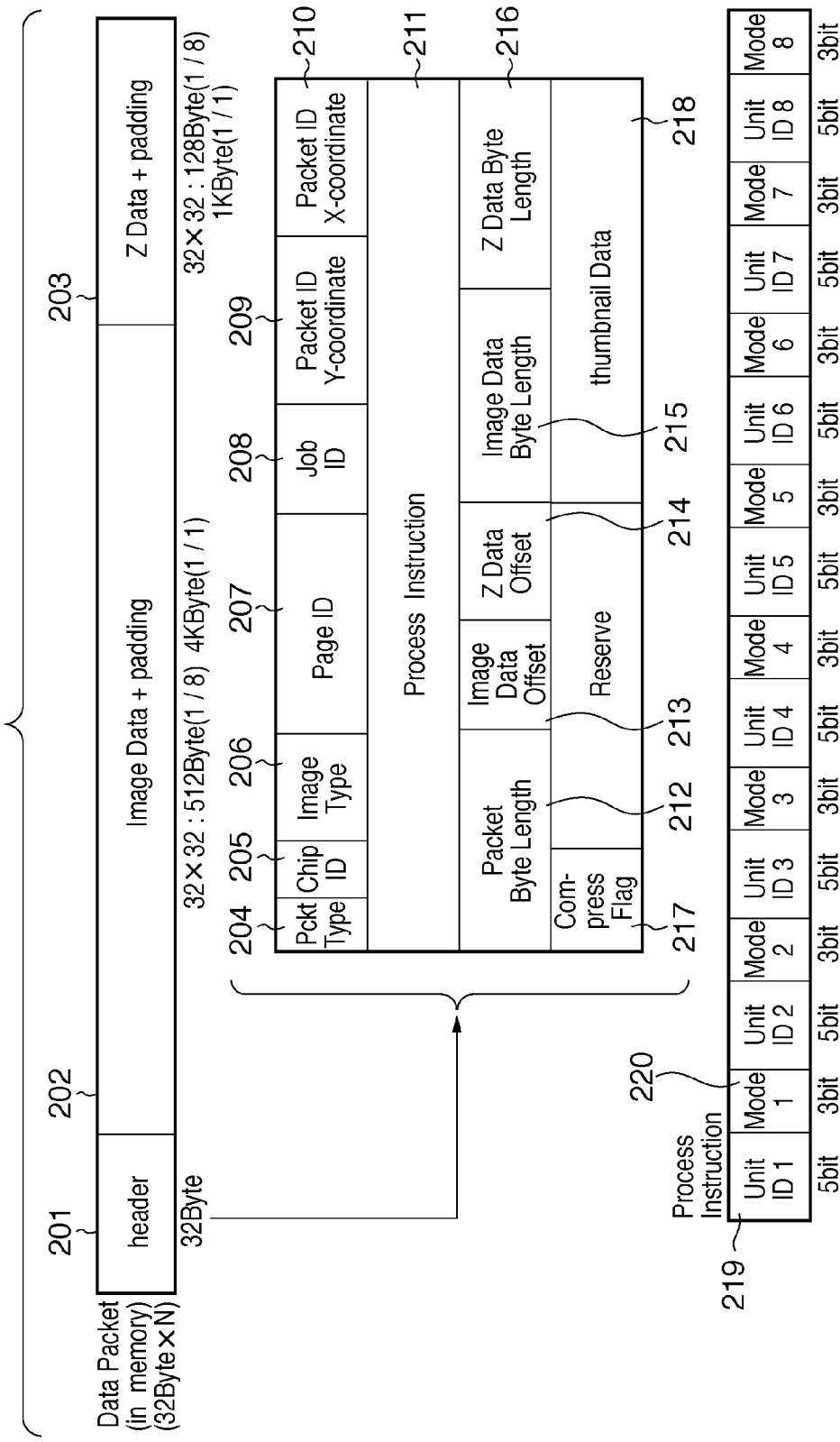
FIG. 2 is a view exemplifying the format of packet data.
Figure 3:
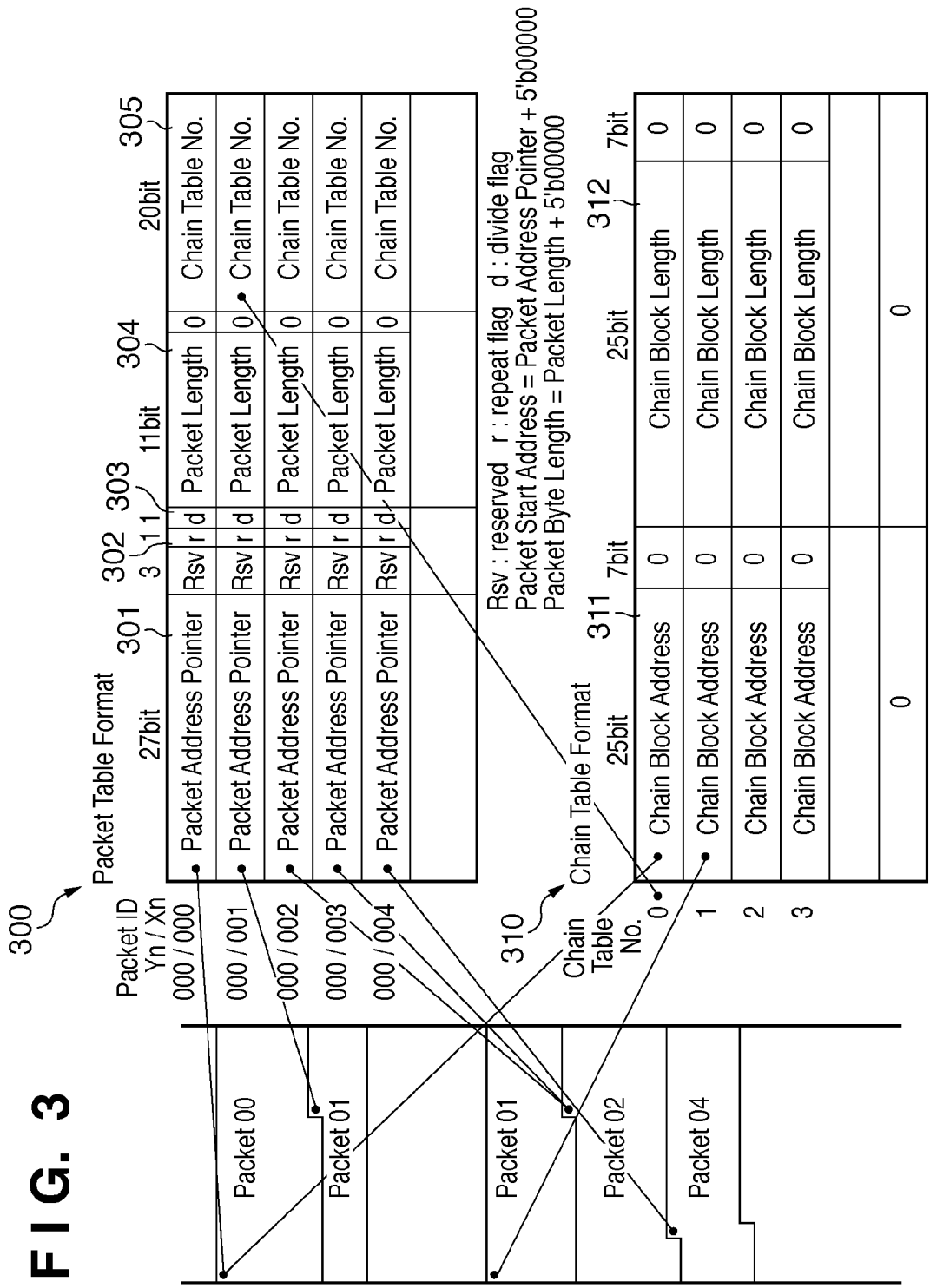
FIG. 3 is a view exemplifying the structures of a chain table and a packet table.

FIGS. 2 and 3 exemplify the format of packet data generated by the CPU 103 of the image processing apparatus and the structures of the chain table and packet table in the embodiment, respectively. Information contained in a packet header 201 will be explained. The type of packet is determined based on a pckt type 204 in the packet header 201, and Data, Command, Interrupt, and the like can be set. A chip ID 205 is an ID (Identifier) for identifying each of the image processing units 104 to 106 serving as packet transmission targets. A page ID 207 indicates the number of a page to which a packet belongs. A job ID 208 indicates the number of a job to which a packet belongs. The packet number is represented by YnXn which is a combination of a packet Y-coordinate 209 and packet X-coordinate 210. Data packets are classified into those for compressed image data and those for uncompressed image data. A compress flag 217 represents whether or not image data is compressed.

Note that image data added to a data packet is obtained by dividing image data of each page input from the scanner 109 or the like for each page into rectangular regions each having a predetermined number of pixels (e.g., 32 pixels×32 pixels). Hence, a plurality of packet data each containing part of image data of each page are generated.

A process instruction 211 is formed from eight pairs each of a unit ID 219 and mode 220, which indicate the order and contents of image processes in the image processing units. For example, in a FuncL 610 serving as an image processing unit in FIGS. 6A and 6B, "1" to "5" are respectively set as the unit IDs of a decompression unit 601, the rotation unit 602, the binarization unit 603, the color space conversion unit 604, and the compression unit 606. A case in which input packet data is compressed through a data path of the decompression unit 601→color space conversion unit 604→rotation unit 602→compression unit 606. At this time, numerals "1", "4", "2", and "5" need to be set in this order in the unit IDs 219 of the process instruction 211 to transfer packet data. In the mode 220, an operation mode unique to an image processing unit indicated by the unit ID is set. After processing, each processing unit shifts the process instruction left by 8 bits. Eight units can successively process one packet.

A packet byte length 212 indicates the total byte count of a packet. An image data byte length 215 indicates the byte count of image data, and a Z data byte length 216 indicates the byte count of additional image information. An image data offset 213 and Z data offset 214 indicate offsets from the starts of the packets of respective data.

Information contained in a packet table 300 will be explained. The packet table 300 manages each packet. The components of the packet table 300 are a packet address pointer 301, a repeat flag 302, a divide flag 303, a packet length 304, and a chain table number 305. By adding "0"s by 5 bits to the values of the packet address pointer 301 and the packet length 304 in the table (equations (1) and (2)), the packet address pointer 301 and the packet length 304 indicate the start address and the byte length of each packet:

$$\text{packet address pointer (27 bits)} + 5b00000 = \text{packet start address} \quad (1)$$

$$\text{packet length (11 bits)} + 5b00000 = \text{byte length of packet} \quad (2)$$

Assume that the packet table 300 and a chain table 310 are not divided. In the packet table 300, packets are always aligned in the scanning direction (X direction) in order of Yn/Xn=000/000, 000/001, 000/002 . . . . An entry in the packet table 300 uniquely represents one packet. An entry next to Yn/Xmax is Y(n+1)/X0. When a packet has exactly the same data as that of an immediately preceding packet, it is not written in the RAM 102. Instead, the same packet address pointer 301 and the packet length 304 as those in the entry of the immediately preceding packet, i.e., first packet, are stored in the entry of the second packet in the packet table. The two table entries therefore indicate one packet data. The repeat flag 302 of the table entry of the second packet is set, thereby reducing the capacity of the RAM 102 that is necessary to store packets. When a packet is divided into a plurality of memory blocks (to be referred to as chain blocks), the divide flag 303 is set, and the chain table number 305 of a chain block containing the start of the packet is set. The entry of the chain table 310 is made up of a chain block address 311 and the chain block length 312. In the final entry of the table, "0" is stored in each of the chain block address 311 and the chain block length 312.

In the packet header, the chip ID 205 indicates the ID of each of the image processing units 104 to 106 serving as packet transmission targets. The page ID 207 indicates the number of a page to which a packet belongs. The job ID 208 indicates the number of a job to which a packet belongs. The output DMAs 110 to 112 properly change these IDs of packet data, and transfer the packet data to a target image processing unit, implementing desired image processing. More specifically, when chip IDs "1" to "3" are respectively assigned to the image processing units 104 to 106 and data is to be transferred to the printer 108, the output DMA is set and executed to set "1" in the chip ID in the header of packet data. The output DMA reads out packet data from the RAM 102 in accordance with the chain table and the packet table in FIG. 3 that represent packets to be processed. Then, the output DMA transfers the packet data to the image processing unit 104, the image processing unit 104 internally performs image processing for the packet data, and the printer 108 prints out the data.

Figure 4A:
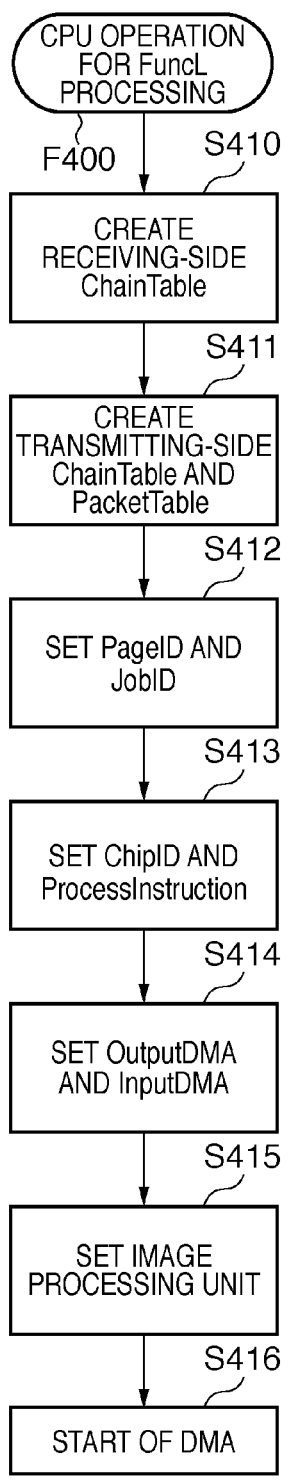
FIGS. 4A, 4B, and 4C are flowcharts showing the procedures of packet data image processing.
Figure 4B:
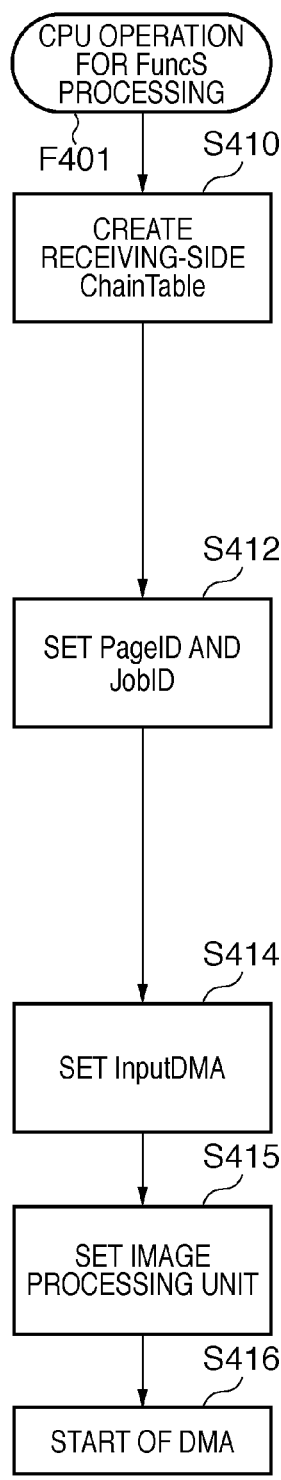
Figure 4C:
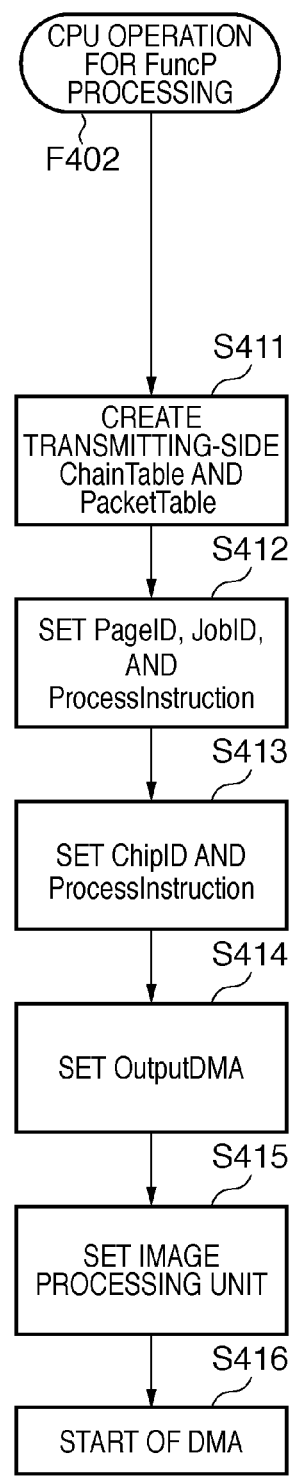

A packet data image processing sequence in the embodiment will be explained in more detail with reference to FIGS. 4A to 4C by giving attention to software processing in the CPU 103. A processing sequence (F400 shown in FIG. 4A) in the CPU 103 when the FuncL performs image processing for packet data stored in the RAM 102 will be described. Note that, for example, reference numeral "F400" denotes a flowchart, and reference numeral "S411" denotes a step in the flowchart.

First, the CPU 103 creates a receiving-side chain table representing an address in the RAM 102 at which packet data is to be stored after FuncL image processing (S410). Then, the CPU 103 creates a transmitting-side chain table and transmitting-side packet table representing the storage location of packet data to be transmitted to the image processing unit (S411). The CPU 103 sets a desired page ID 207 and job ID 208 in transmission packet data stored at the position indicated by the tables created in S411 (S412). Subsequently, the CPU 103 sets, in the chip ID 205, the chip ID of an image processing unit which is to perform image processing. The CPU 103 determines a process instruction 211 and sets it in the packet header 201 in order to designate the internal image processing path of the image processing unit (S413).

The page ID 207, the job ID 208, the chip ID 205, and the process instruction 211 are set for all packets to undergo image processing. As the setting method, the packet header may be rewritten by the CPU 103, or rewritten by hardware based on settings for the output DMAs 110 to 112 before transferring the packet to the image processing unit. When performing image processing through a data path requiring transmission/reception of packet data, like the FuncL, one of the output DMAs 110 to 112 on the transfer side and one of the input DMAs on the receiving side are set (S414). Finally, processing of each DMA starts, thereby starting image processing for the packet (S415 and S416).

This processing sequence of the CPU 103 is premised on execution of FuncL image processing. In FuncS image processing, input packet data is sent from the scanner 109 to the RAM 102 via the image processing unit. Therefore, neither creation of a transmitting-side table nor setting of the output DMA is necessary (case of F401). In FuncP image processing, output packet data is output from the printer 108 via the image processing unit, so neither creation of a receiving-side table nor setting of the input DMA is necessary (case of F402).

FIG. 5 shows a processing flowchart F500 for packet data transferred to the image processing unit. Since image processing itself for packet data changes depending on the function of each image processing unit, attention is given to processing by a packet input/output I/F common to the respective image processing units. Upon receiving packet data (S501), the packet input/output I/F checks whether the chip ID in the packet header matches one assigned to the current image processing unit (S502). If the chip ID in the packet header is different from one assigned to the current image processing unit, the packet input/output I/F determines that the current image processing unit need not process the packet data, and transfers the packet data to the next image processing unit (S505). If the chip ID in the packet header matches one assigned to the current image processing unit, the packet input/output I/F supplies the packet data to an internal image processing path and executes image processing in accordance with the process instruction (S503). When the image processing unit such as the FuncL needs to send back the packet data to the RAM 102, it returns the packet data to the packet input/output I/F. The packet input/output I/F changes the chip ID to "0" (indicating write-back in the RAM 102 of the system) (S504), and transfers the packet data to the next image processing unit (S505).

In the image processing apparatus, the CPU 103 itself need not perform image processing for image data, and suffices to only make image processing settings of the desired image processing units 104 to 106 and transfer settings of packet data by the DMAs 110 to 115. This greatly reduces the load necessary for data management and data transfer control on the CPU. A plurality of image processing units 104 to 106 and a plurality of DMAs 110 to 115 can parallel-execute image processes for respective jobs, such as the copy function and the send function.

The speed of the FuncL function can be increased using a plurality of image processing circuits having the FuncL function in the image processing units 104 to 106. The following method is adopted to suppress an increase in circuit scale while increasing the image data processing speed.

For example, as the first method, the image processing units 104 to 106 are formed from reconfigurable processors, and the mounted FuncP, FuncS, and FuncL are used by switching in a system example. The image processing units can therefore be reduced to downsize the entire circuit. As the second method, the compression unit, the decompression unit, and the raster/packet conversion function mounted in the FuncL are shared with the FuncP and FuncS, and an image processing unit as a difference is used by switching the data path, thereby downsizing the whole circuit.

Figure 6A:
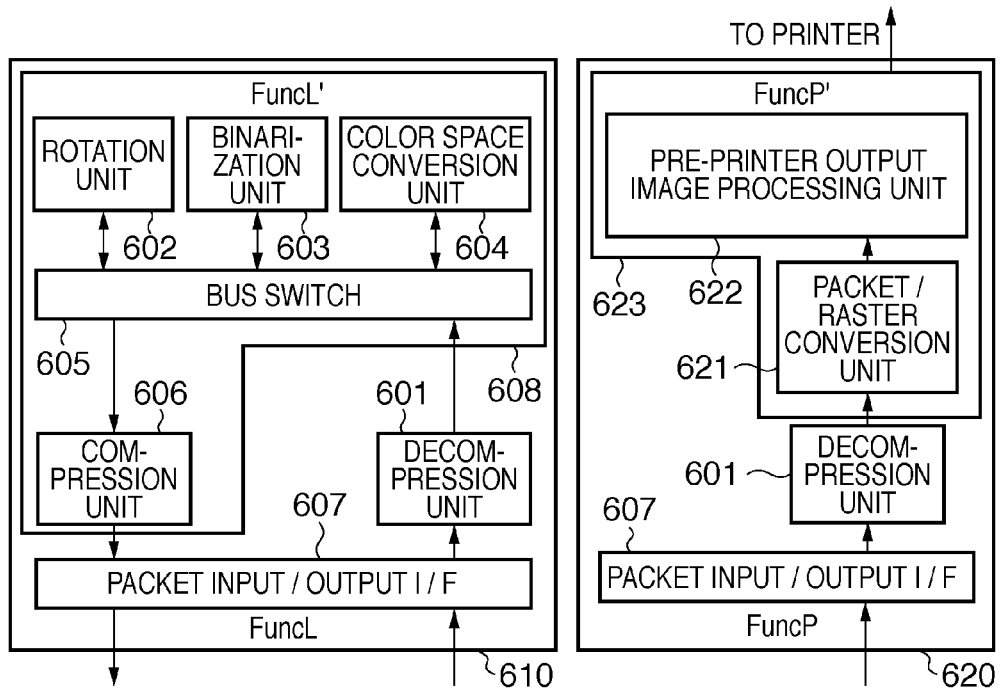
FIGS. 6A and 6B are block diagrams exemplifying the arrangements of image processing units having FuncL, FuncP, and FuncS functions.

As an example of the second method, when there are image processing units 610 and 620 having the FuncL and FuncP functions, respectively, as shown in FIG. 6A, the packet input/output I/F and the decompression unit is common to the two functions. The remaining parts (to be referred to as a FuncL' 608 and FuncP' 623) are data processing parts unique to the FuncL and FuncP. Hence, only the part common to the FuncL and FuncP is shared, like a FuncLP 700 which is an image processing unit in FIG. 7. For the remaining parts, a switch 701 switches the data path to exclusively use the two functions by time division, thereby downsizing the circuit of the common part.

Figure 6B:
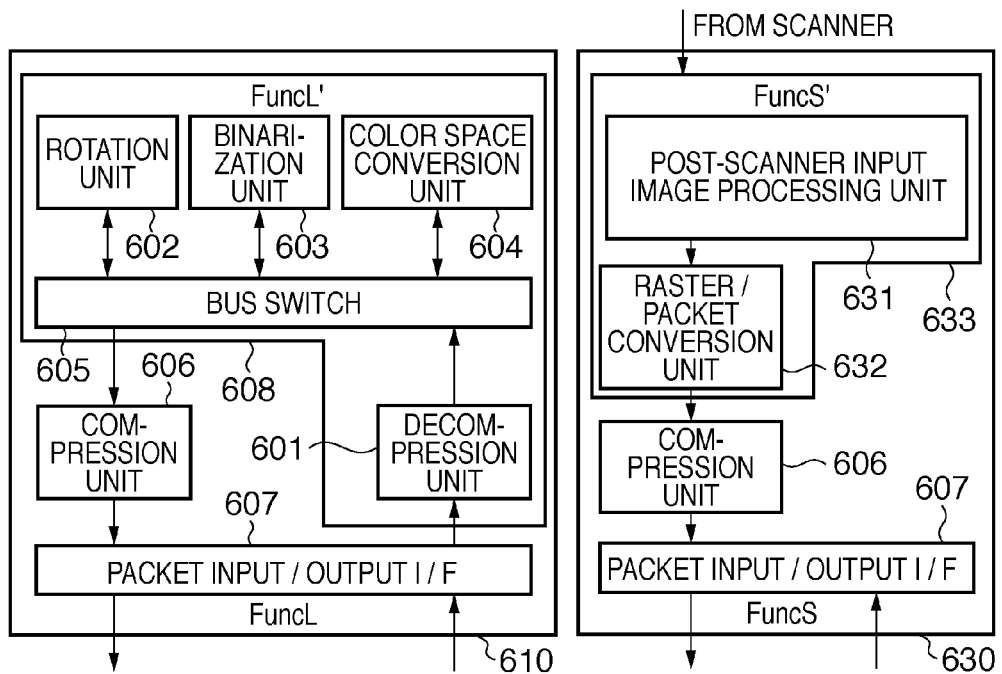

Similarly, when there are the image processing unit 610 and an image processing unit 630 having the FuncL and FuncS functions, respectively, as shown in FIG. 6B, the compression unit 606 is common to the two functions. The remaining parts (to be referred to as the FuncL' 608 and a FuncS' 633) are data processing parts unique to the FuncL and FuncS. Thus, only the part common to the FuncL and FuncS is shared, like a FuncLS 800 in FIG. 8. For the remaining parts, a switch 801 switches the data path to exclusively use the two functions by time division, thereby downsizing the circuit of the common part.

Figure 7:
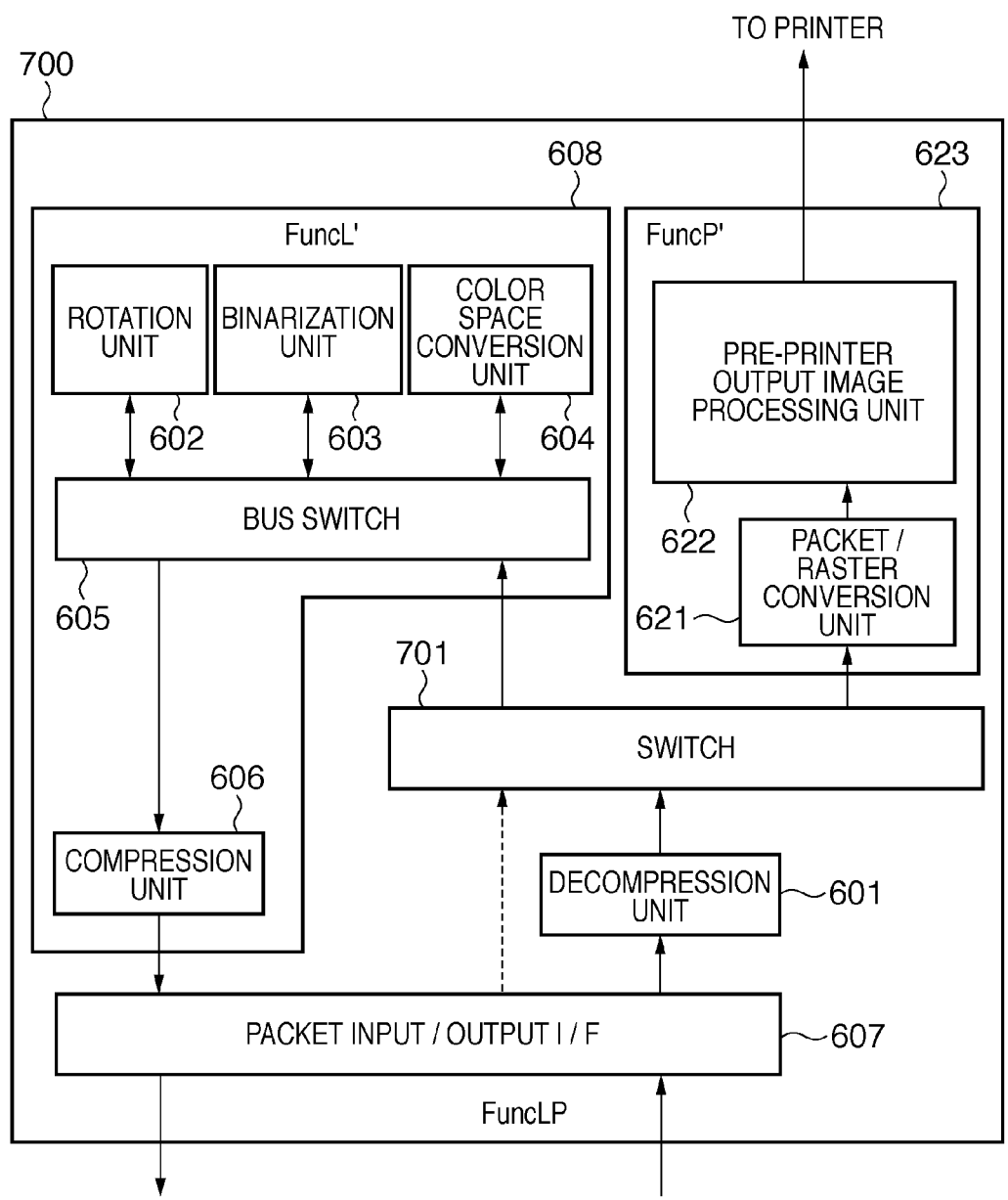
FIG. 7 is a block diagram exemplifying the arrangement of an image processing unit in the embodiment.

The image processing unit 104 shown in FIG. 1 is configured like the FuncLP 700 in FIG. 7, and has the chip ID=1. The image processing unit 105 is configured like the FuncLS 800 in FIG. 8, and has the chip ID=2. The image processing unit 106 is configured like the FuncL 610 in FIG. 6A, and has the chip ID=3.

Details of the FuncLP 700 in FIG. 7 will be further described. The FuncLP 700 is an image processing unit capable of processing the image processing functions of both the FuncL 610 and FuncP 620 in FIG. 6A by time division. The FuncL 610 in FIG. 6A decompresses input packet data, performs image processing, compresses the packet data again, and transfers it to the subsequent image processing unit in accordance with the processing flowchart of FIG. 5 described above. In the FuncP 620, the decompression unit 601 decompresses input packet data, a packet/raster conversion unit 621 rasterizes the packet data, and a pre-printer output image processing unit 622 performs image processing. After that, the FuncP 620 outputs the image to the printer 108. In the FuncLP 700, the switch 701 switches between the FuncL' 608 and FuncP' 623 which are uniquely arranged in the FuncL 610 and FuncP 620, respectively. The circuit is downsized by sharing a packet input/output I/F 607 and the decompression unit 601 which are common to the FuncL 610 and the FuncP 620.

Figure 8:
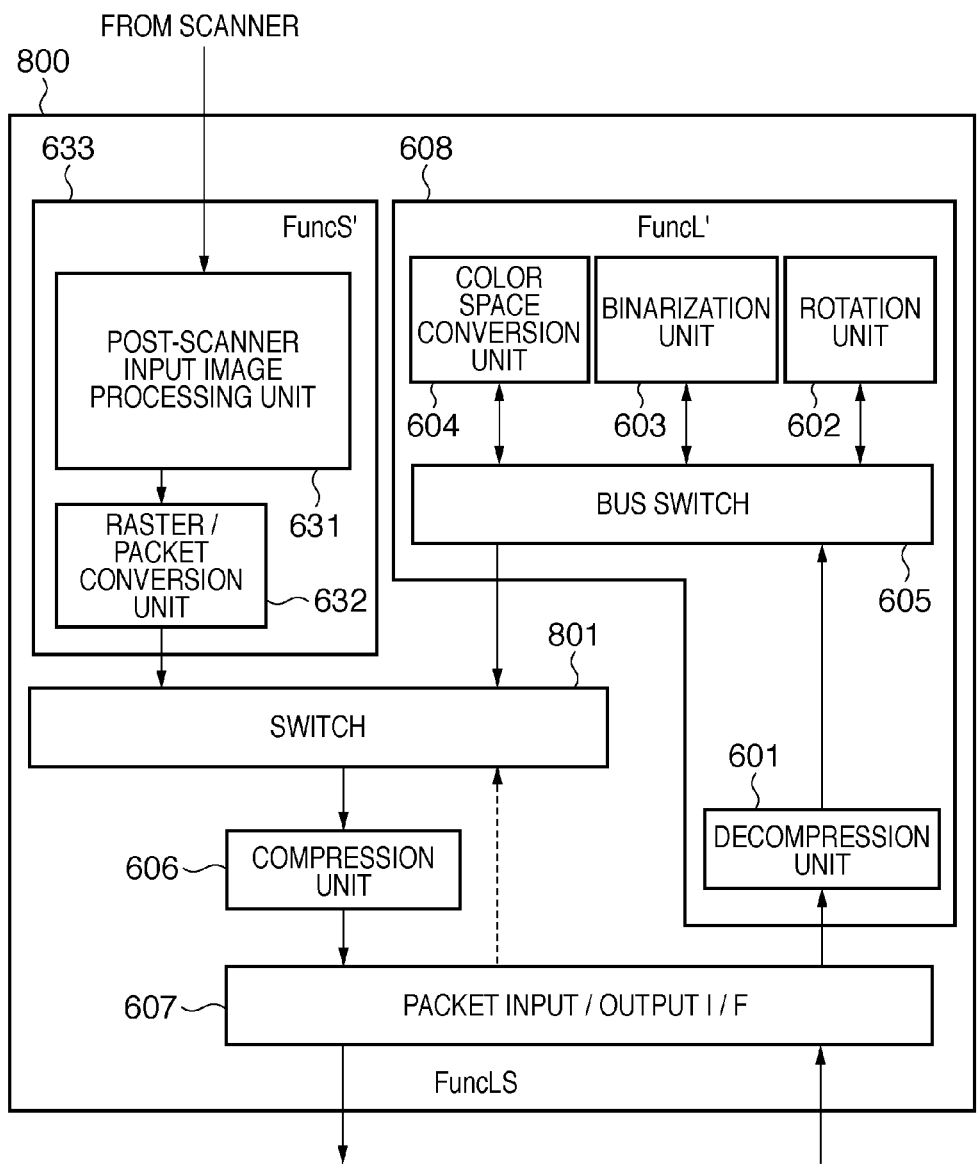
FIG. 8 is a block diagram exemplifying the arrangement of another image processing unit in the embodiment.

Details of the FuncLS 800 in FIG. 8 will be further described. The FuncLS 800 is an image processing unit capable of processing the image processing functions of both the FuncL 610 and FuncS 630 in FIG. 6B by time division. In the FuncS 630 of FIG. 6B, a post-scanner input image processing unit 631 performs image processing for raster data input from the scanner, a raster/packet conversion unit 632 converts the raster data into a packet, and the compression unit 606 compresses the packet. The FuncS 630 then outputs the image to the subsequent image processing unit. In the FuncLS 800, the switch 801 switches between the FuncL' 608 and FuncS' 633 which are uniquely arranged in the FuncL 610 and FuncS 630, respectively. The circuit is downsized by sharing the packet input/output I/F 607 and compression unit 606 which are common to the FuncL 610 and the FuncS 630.

Figure 9:
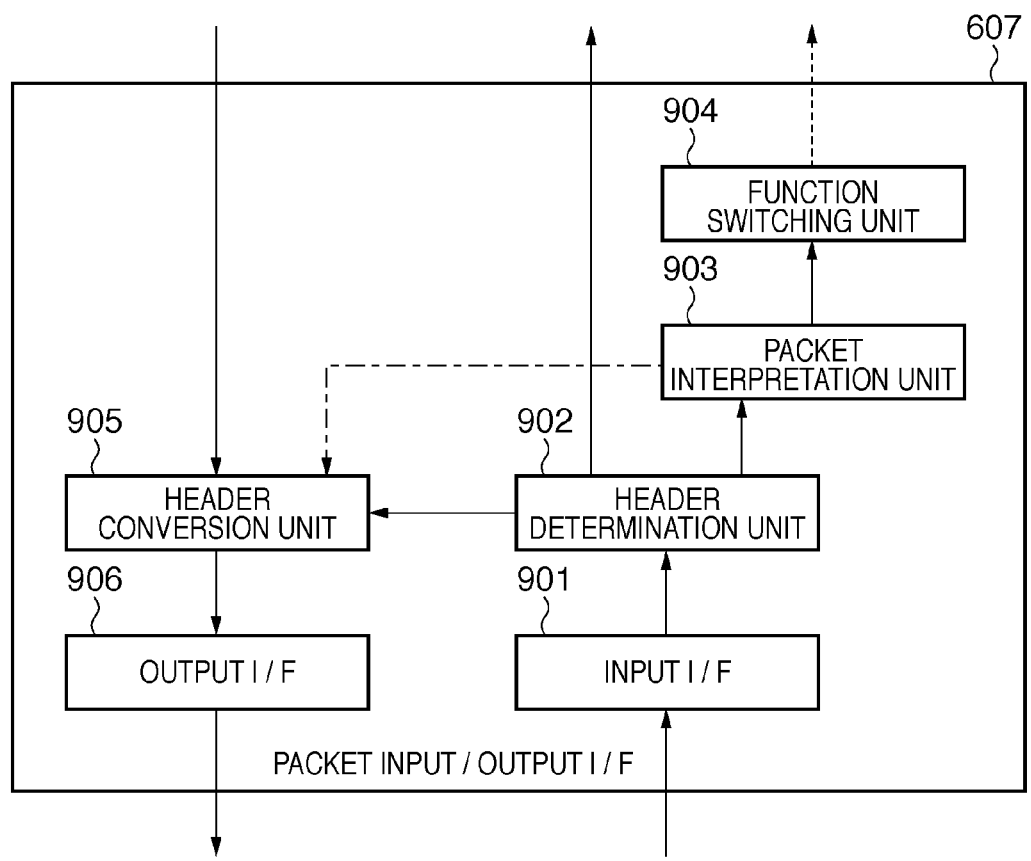
FIG. 9 is a block diagram exemplifying the arrangement of a packet input/output I/F in the image processing unit.
Figure 10:
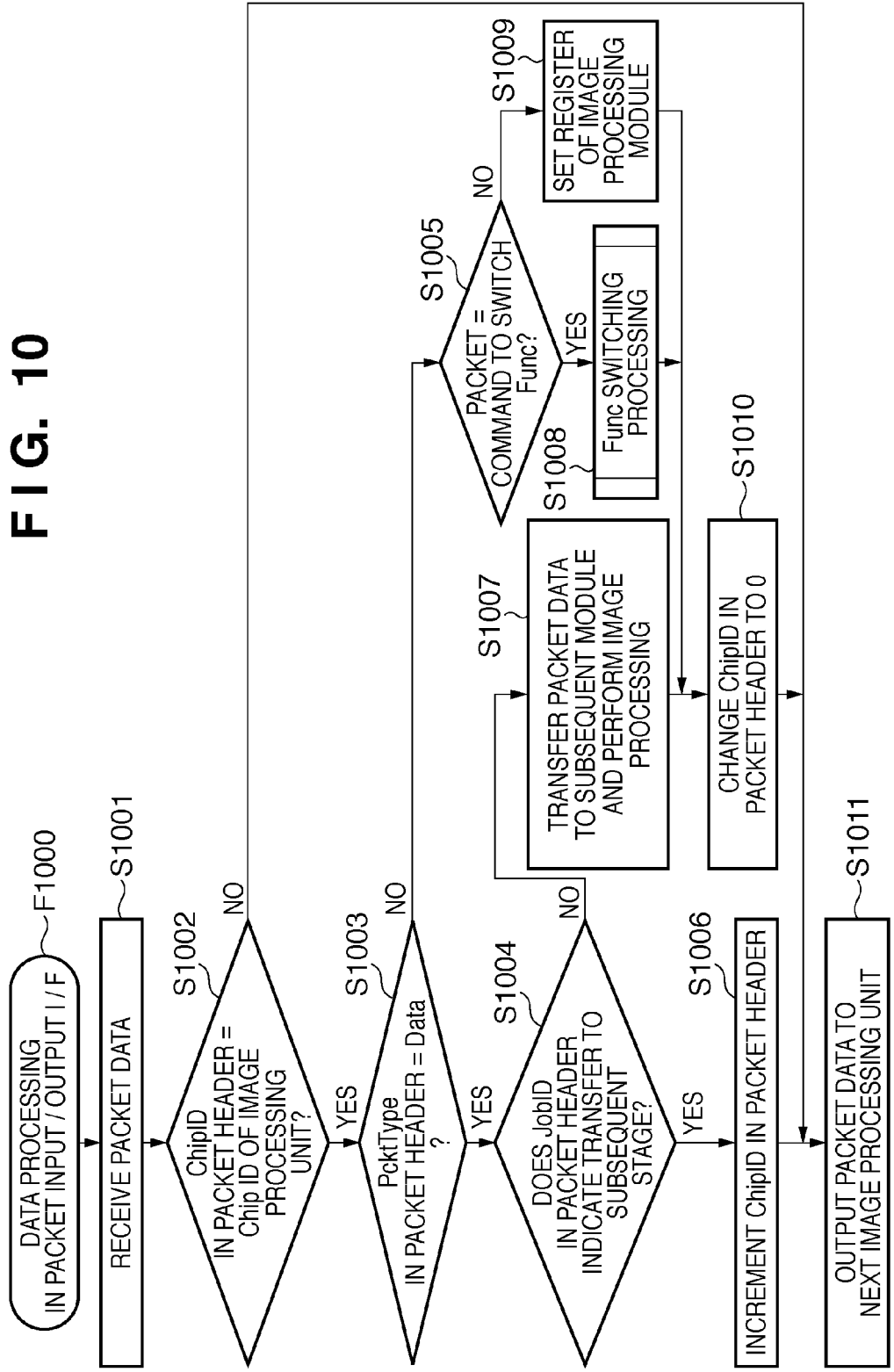
FIG. 10 is a flowchart showing processing procedures by the packet input/output I/F.

FIG. 9 shows the internal arrangement of the packet input/output I/F 607 in the embodiment. A processing sequence in the packet input/output I/F 607 will be described with reference to a flowchart F1000 in FIGS. 10 and 11. First, the packet input/output I/F externally receives packet data via an input I/F 901 (S1001). The input I/F 901 transfers the received packet data to a header determination unit 902. The header determination unit 902 determines whether the chip ID 205 in the packet header matches a chip ID assigned to the current image processing unit (S1002). If the two chip IDs are different from each other, the header determination unit 902 directly outputs the packet data to the next image processing unit via a header conversion unit 905 and output I/F 906 (S1011). If the two chip IDs match each other, the header determination unit 902 determines whether the pckt type 204 in the packet header is Data (0x001) or Command (0x010) (S1003).

If the pckt type 204 in the packet header is Command, the header determination unit 902 transfers the packet to a packet interpretation unit 903. The packet interpretation unit 903 interprets Command packet data in which image data 202 of the packet data has a data format as shown in FIG. 12, and determines whether the Command is one to switch the function (S1005). If the Command is not one to switch the function, a data set 1200 shown in FIG. 12 is a combination of the register address and set value of one module in the image processing unit, and is set for each module (S1009). If the Command is one to switch the function, the packet interpretation unit 903 notifies a function switching unit 904 of a message to this effect.

Figure 11:
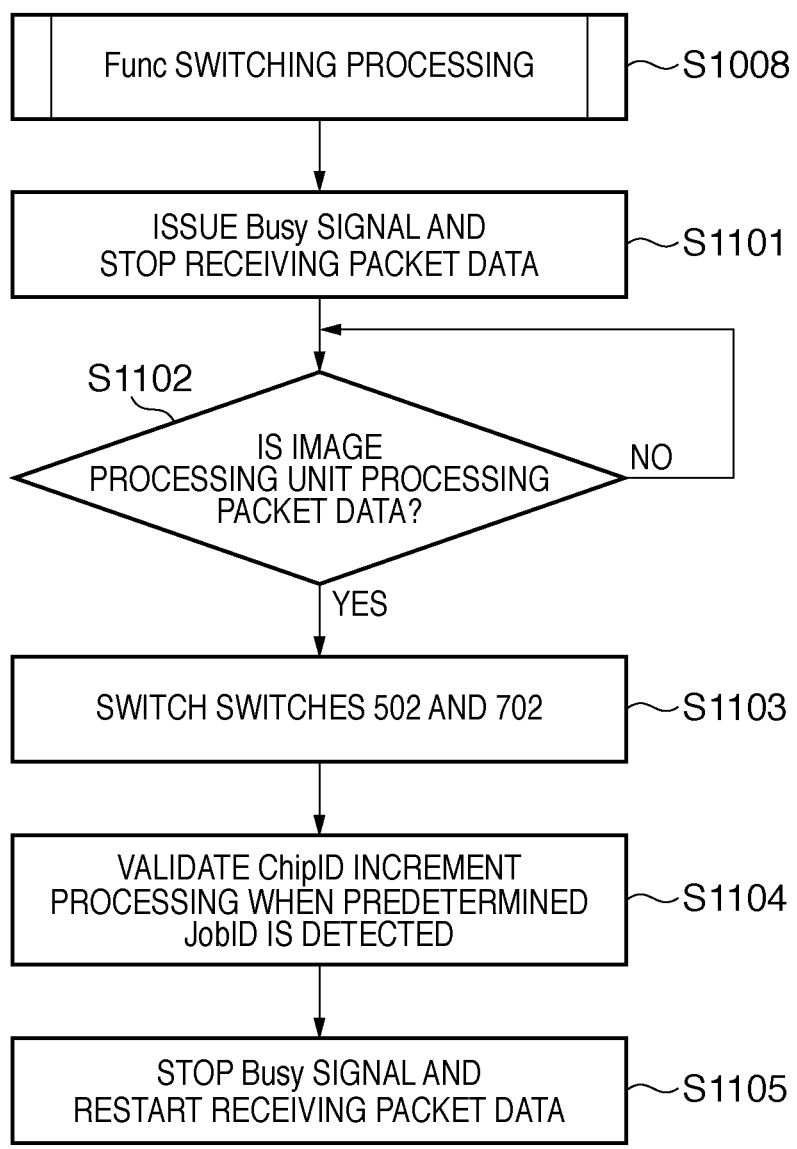
FIG. 11 is a flowchart showing the procedures of Func switching processing.

The function switching unit 904 switches the function of the image processing unit according to a flowchart shown in FIG. 11. First, the function switching unit 904 issues a Busy signal via the input I/F 901 to stop receiving new packet data (S1101). Based on the count value of packets input/output to/from the packet input/output I/F, the function switching unit 904 determines whether the image processing unit is internally processing image packet data (S1102). If the image processing unit is internally processing image packet data, the function switching unit 904 waits until the processing is completed and the resultant image packet data is output. When all image packet data which have been processed in the image processing unit are output to the subsequent stage, the function switching unit 904 switches the switch 701 or 801 to transfer the packet data from the FuncL' to the FuncP' and FuncS' (S1103). Then, the function switching unit 904 validates chip ID increment processing which is executed by the header determination unit 902 upon receiving a predetermined job ID in S1004 (to be described later) (S1104). After performing the processing, the function switching unit 904 stops the Busy signal which has been issued via the input I/F 901, and accepts new packet data (S1105).

If the header determination unit 902 determines in S1003 that the pckt type is Command, the header conversion unit 905 changes the chip ID in the original packet data to "0" after processing in S1008 or S1009, and outputs the packet data to the subsequent image processing unit (S1010). This can prevent the subsequent image processing unit from receiving packet data.

If the header determination unit 902 determines in S1003 that the pckt type 204 in the packet header is Data, it further determines whether the job ID 208 in the packet header represents transfer to the subsequent stage. This determination is made at two stages. First, in Func switching processing S1008, the header determination unit 902 determines whether the increment processing has been validated in step S1104. If the increment processing is valid and the magnitude of the numerical value of the job ID 208 is smaller than that of a predetermined numerical value, the header determination unit 902 determines to process the packet data in the FuncL. The header determination unit 902 thus transfers the packet data to the header conversion unit 905 without transferring it within the image processing unit. The header conversion unit 905 determines that the packet is to be processed in the subsequent FuncL image processing unit, and increments the chip ID 205 in the packet header (S1006). The header conversion unit 905 outputs the packet so that the subsequent image processing unit can receive and process it (S1011). If the magnitude of the numerical value of the job ID 208 is equal to or larger than that of the predetermined numerical value, the header determination unit 902 determines to process the packet data in the FuncP' or FuncS'. In this case, the header determination unit 902 transfers the packet data to a subsequent module in the packet input/output I/F 607 to perform image processing (S1007). In S1010, the header conversion unit 905 changes the chip ID in the original packet data to "0", and outputs the packet data to the subsequent image processing unit.

In S1004, job priority is determined based on the magnitude with respect to a given threshold, and packet data is distributed. However, a determination using the job ID 208 may comply with another method. For example, the type of Func to process a packet is assigned to one bit of the job ID 208, and it is determined which of FuncL and FuncP/FuncS is to process a packet. Alternatively, the job ID 208 of image packet data processed immediately before Func switching processing in step S1008 may be held and used to determine in S1004 which of FuncL and FuncP/FuncS is to process packet data.

In this method, it is important to detect packet data transmitted on the premise that it is to be processed by the FuncL' function when processing in the image processing unit is switched from the FuncL' function for a low-priority job to the FuncP' or FuncS' function for a high-priority job. Further, the chip ID 205 is changed to transfer the detected packet data to the subsequent image processing unit having the FuncL' function and processing it by the alternative image processing unit. In the embodiment, image processing by the FuncP' and FuncS' functions for high priority is defined as the first image processing. Image processing by the FuncL' function, lower in priority than the FuncP' and FuncS' functions, is defined as the second image processing. Packet data to undergo the first image processing is defined as the first packet data, and packet data to undergo the second image processing is defined as the second packet data.

Figure 13A:
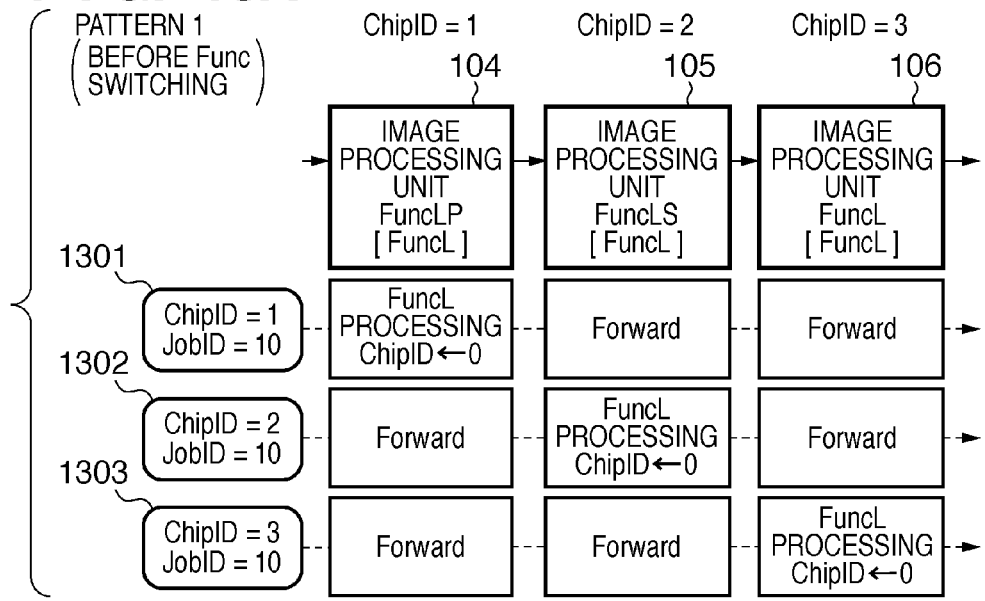
FIGS. 13A and 13B are views showing an outline of packet processing in each image processing unit.
Figure 13B:
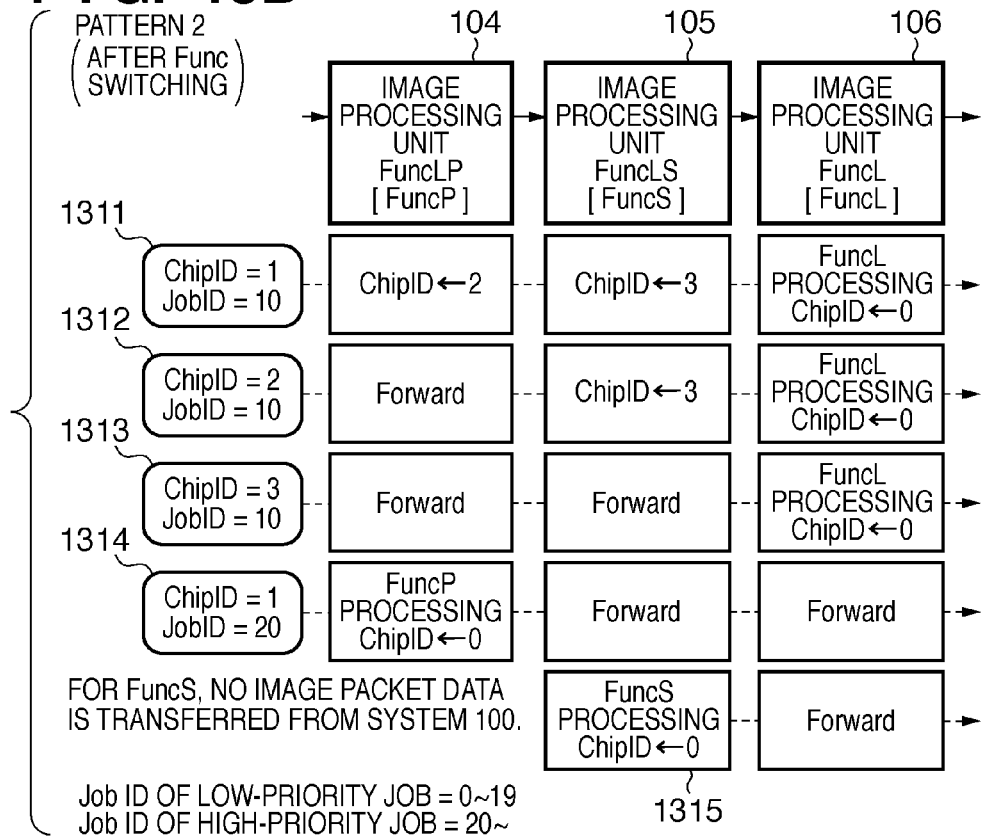

FIGS. 13A and 13B show an outline of packet processing in the respective image processing units before and after Func switching. According to the flowchart of FIG. 10, processes for an image data packet are roughly classified into three patterns. The first pattern is a sequence when the chip ID in the header is different from that of the current image processing unit and an image data packet is directly transferred to the subsequent stage (processing 1). In the flowchart F1000, processing 1 is a sequence of S1001→S1002→S1011. The second pattern is a sequence when an image data packet having the job ID 208 of a low-priority job is received before Func switching or an image data packet having the job ID 208 of a high-priority job is received after Func switching, and the received image data packet is processed in the image processing unit (processing 2). In the flowchart F1000, processing 2 is a sequence of S1001→S1002→S1003→S1004→S1007→S1010→S1011. The third pattern is a sequence when an image data packet having the job ID of a low-priority job is received after Func switching, the chip ID in the packet header is incremented, and the image data packet is transferred to the subsequent image processing unit (processing 3). In the flowchart F1000, processing 3 is a sequence of S1001→S1002→S1003→S1004→S1006→S1011.

The respective image processing units execute one of processes 1 to 3 for image packet data transferred in the processes shown in FIGS. 13A and 13B in accordance with the chip IDs assigned to the image processing units 104 and 106 and the job ID 208 and chip ID 205 of the header. In pattern 1 in which all the image processing units operate in the FuncL mode, the image processing unit 104 performs FuncL processing for an image data packet 1301 having chip ID=1 and job ID=10 in the header, and the chip ID 205 in the header is rewritten into 0 (processing 2). The image processing units 105 and 106 directly transfer the image data packet 1301 to the subsequent stages (processing 1). For an image data packet 1302 having chip ID=2 and job ID=10 in the header, the image processing unit 104 performs processing 1, the image processing unit 105 performs processing 2, and the image processing unit 106 performs processing 1. For an image data packet 1303 having chip ID=3 and job ID=10 in the header, the image processing units 104 and 105 perform processing 1, and the image processing unit 106 performs processing 3.

For an image data packet 1311 having chip ID=1 and job ID=10 in the header, the image processing units 104 and 105 whose functions have switched to FuncP and FuncS (pattern 2) execute processing 3 to increment the chip ID 205. Then, the image processing unit 106 executes processing 2 to perform FuncL image processing. As a result, the image data packet which is to be originally processed by the image processing unit 104 (specific image processing unit) can be processed by the image processing unit 106 (another image processing unit). For an image data packet 1312 having chip ID=2 and job ID=10 in the header, the image processing unit 104 performs processing 1, and the image processing unit 105 whose function has switched to FuncS executes processing 3 to increment the chip ID 205. Then, the image processing unit 106 executes processing 2 to perform FuncL image processing. Accordingly, the image processing unit 106 can process the image data packet which is to be originally processed by the image processing unit 105. For an image data packet 1313 having chip ID=3 and job ID=10 in the header, the image processing units perform the same processes as those for the image data packet 1303 before Func switching (pattern 1).

For an image data packet 1314 of a high-priority job having chip ID=1 and job ID=20 in the header, the image processing unit 104 performs FuncP processing 2, and the image processing units 105 and 106 perform processing 1. For an image data packet 1315 input from the scanner 109 to the image processing unit 105 whose function has switched to FuncS, the raster/packet conversion unit 632 converts the data into a packet. Further, the chip ID=0 and a set value to the job ID=FuncS are added to the header of the image data packet 1315, which is output to the subsequent image processing unit 106. The image processing unit 106 executes processing 1.

Figure 16A:
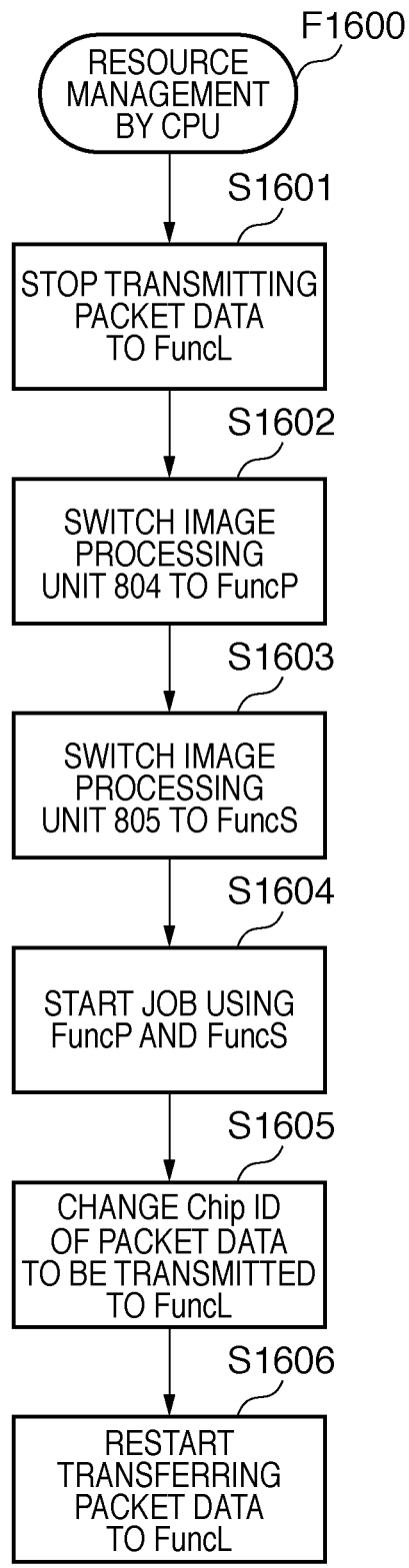
FIGS. 16A and 16B are flowcharts for explaining the effect of the packet input/output I/F.

The effects of the present invention will be explained with reference to FIGS. 16A and 16B. If no packet input/output I/F shown in FIG. 9 is arranged, the CPU 103 needs to manage the resources of the image processing unit, as represented by F1600 in FIG. 16A. First, the CPU 103 stops transmitting packet data to the image processing units 104 to 106 which have operated as the FuncL function (S1601). To use the image processing unit for a high-priority job, the CPU 103 switches the FuncLP of the image processing unit 104 from the FuncL function to the FuncP function (S1602). Similarly, the CPU 103 switches the FuncLS of the image processing unit 105 from the FuncL function to the FuncS function (S1603). After that, the CPU 103 starts the operation of the high-priority job using the function-switched image processing units 104 and 105 (S1604). Although not shown, the input of an image from the scanner 109, FuncS image processing, FuncP image processing, and the output of an image to the printer 108 are executed for the high-priority job. Only the image processing unit 106 is available for a low-priority job whose packet data to the three image processing units 104 to 106 having the FuncL function has been stopped. Hence, the CPU 103 changes the chip IDs of all packet headers to "3" representing the image processing unit 106 (S1605). Then, the CPU 103 restarts transmitting packet data to the FuncL (S1606).

Figure 16B:
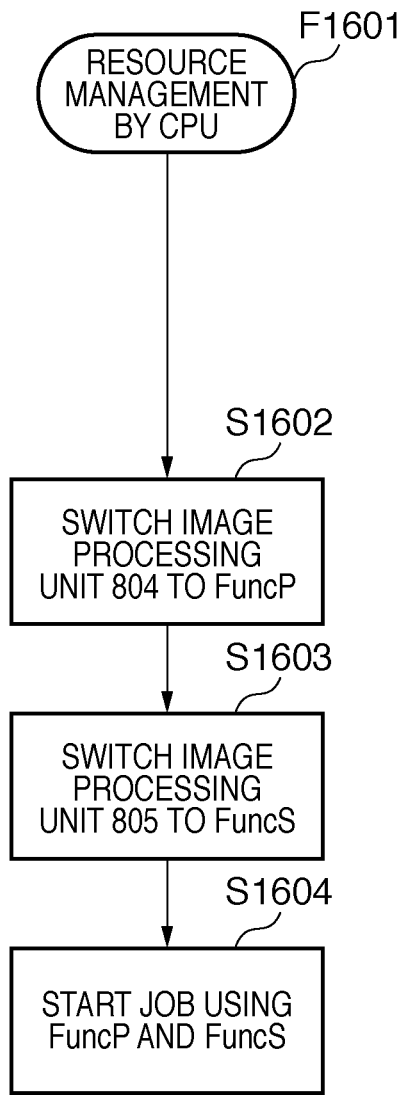

However, when the packet input/output I/F shown in FIG. 9 is arranged, the CPU 103 needs neither a stop in packet data transmission to the image processing unit in S1601 nor a change in the chip ID in S1605 in software processing, as represented by F1601 in FIG. 16B. In other words, in resource management, the CPU needs to only switch the function of each image processing unit in accordance with a high-priority job and start the operation of the high-priority job. Thus, the load of software associated with scheduling is reduced.

As is apparent from the above-described processing sequences, arranging the packet input/output I/F which implements the gist of the present invention makes it possible to automatically transfer the image data packet of a low-priority job to the subsequent image processing unit without stopping DMA transfer. This can decrease the load of software processing concerning DMA transfer processing for a low-priority job.

Second Embodiment

In the first embodiment, the image processing units 104 and 105 are configured to switch two image processes by switching the internal image processing path. However, the present invention is not limited to this arrangement. That is, a device such as a reconfigurable circuit (e.g., reconfigurable processor) may be adopted to rewrite and use the internal circuit, instead of using two image processing circuits by time division.

Figure 14:
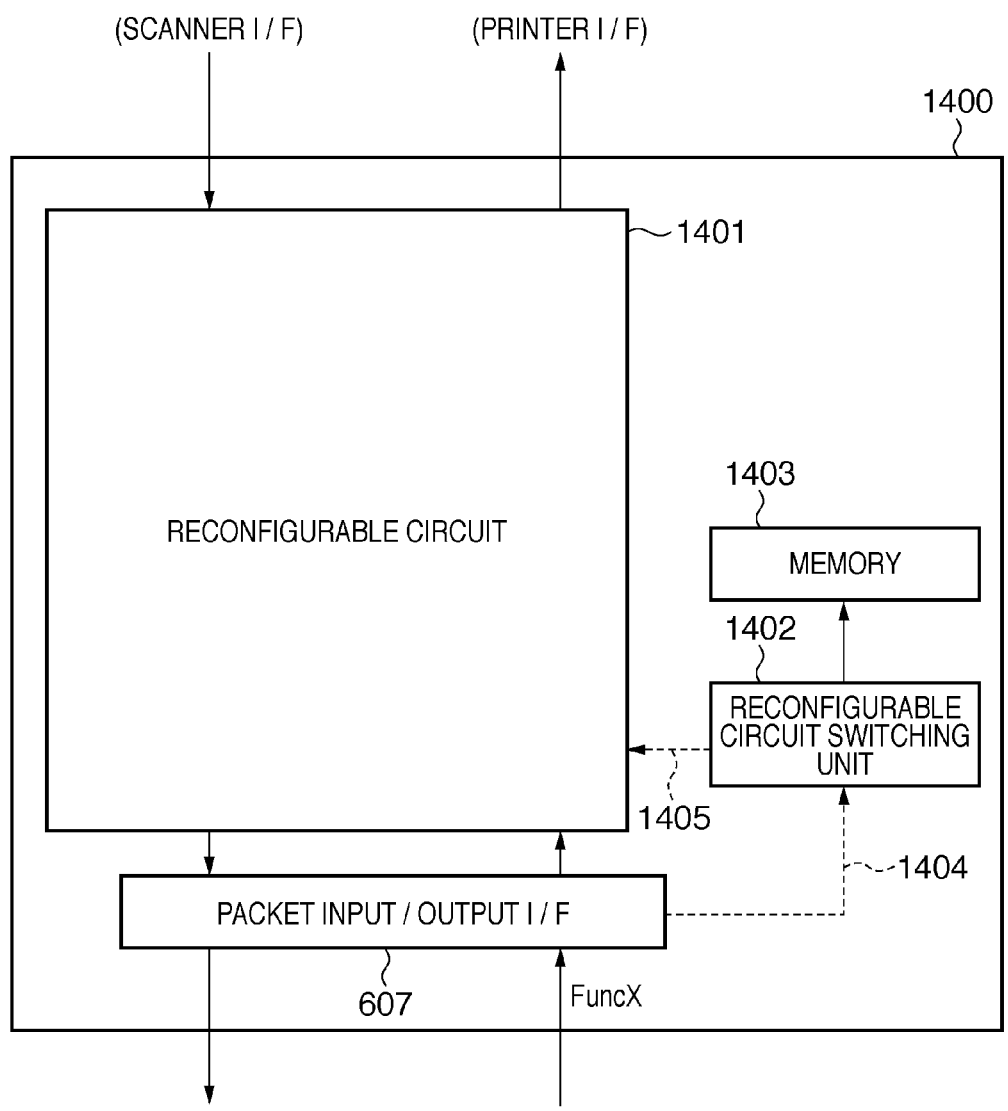
FIG. 14 is a block diagram exemplifying the arrangement of an image processing unit using a reconfigurable circuit in the second embodiment.

FIG. 14 shows an image processing unit 1400 having a reconfigurable circuit 1401 capable of dynamically switching the internal logic. In the second embodiment, image processing units 104 to 106 are arranged as the image processing unit 1400 as shown in FIG. 14.

The image processing unit 1400 includes the reconfigurable circuit 1401 and a packet input/output I/F 607. The packet input/output I/F has the same arrangement as that shown in FIG. 9. Image processing units 700 and 800 are different in the following way from those described in the first embodiment.

The reconfigurable circuit 1401 can rewrite its internal circuit configuration to change the whole image processing unit 1400 into one of a FuncL 610 and FuncP 620 in FIG. 6A and a FuncS 630 in FIG. 6B. More specifically, a function switching unit 904 is implemented to issue a switching instruction not to switches 701 and 801 but to a reconfigurable circuit switching unit 1402 in Func switching processing shown in the flowchart of FIG. 11 (dotted line 1404). Upon receiving the switching instruction, the reconfigurable circuit switching unit 1402 rewrites the reconfigurable circuit 1401 to change the image processing unit 1400 into one of the FuncS, FuncP, and FuncL, based on configuration information stored in advance in a memory 1403 (dotted line 1405). This is the difference from the first embodiment.

With this arrangement, the image processing unit 1400 can be configured without arranging two switching circuits, unlike the image processing units 700 and 800, thereby further downsizing the circuit.

Third Embodiment

In the first and second embodiments, when the image processing unit, which has switched to an image processing circuit for high priority, receives a low-priority processing packet, it increments the chip ID so that the subsequent image processing unit for low priority can receive and process the packet (S1006). However, the transfer method to the subsequent image processing unit in the present invention is not limited to this.

For example, if software understands the switching state of each image processing unit, it can determine which image processing units 104 to 106 are to be switched in response to the input of a high-priority job. More specifically, when the image processing units 104 to 106 parallel-operate as the FuncL, and the image processing units 104 and 105 need to be switched to the FuncP and FuncS in response to the input of a high-priority job, the software can also grasp that it suffices to transfer a low-priority job to the image processing unit 106. At this time, the overhead of determination by each image processing unit can be reduced by rewriting the chip ID of low-priority processing packet data to chip ID=3 which indicates the image processing unit 106, instead of incrementing the chip ID in the image processing units 104 and 105 which have been switched to the FuncP and FuncS. That is, the total throughput of the image processing units 104 to 106 increases.

To rewrite the chip ID of low-priority processing packet data to chip ID=3 in the image processing unit 104 or 105, an instruction to rewrite the chip ID is issued before or at the same time as an instruction to switch the functions of the image processing units 104 and 105. In the image processing unit 104 or 105, a packet interpretation unit 903 recognizes a chip ID number to rewrite the current one, and transfers the information to a header conversion unit 905 to hold the information (chain line in FIG. 9). When the image processing unit 104 or 105 receives a low-priority packet after function switching, the header conversion unit 905 rewrites the chip ID to "3" in accordance with the held chip ID information, and transfers the packet to the subsequent stage. The image processing unit 106 processes the transferred low-priority packet having chip ID=3.

Figure 15:
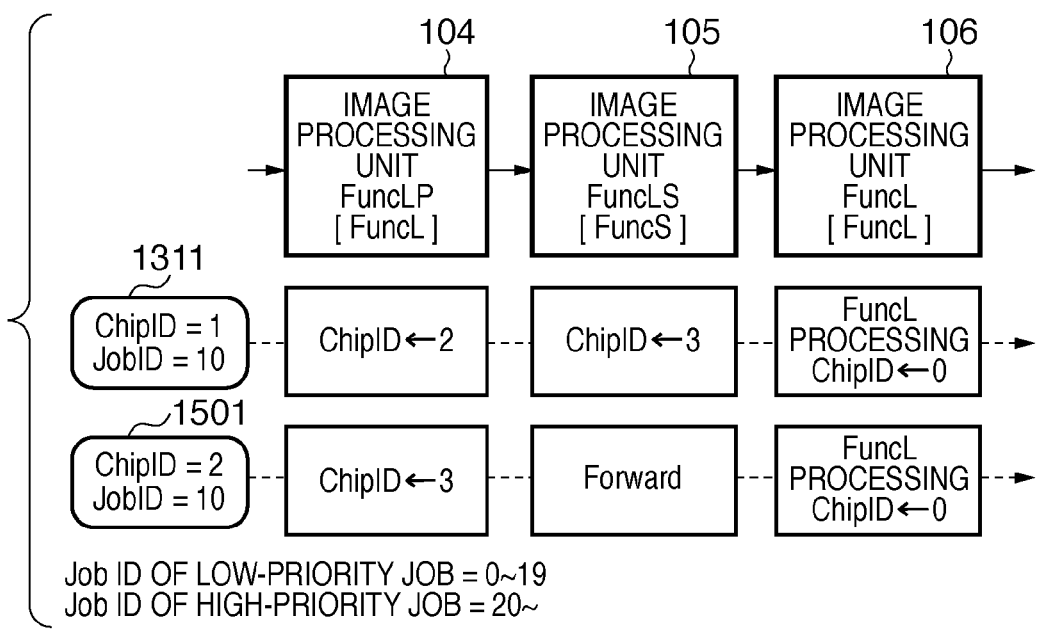
FIG. 15 is a view showing a comparison in a change of the chip ID between the first and third embodiments.

FIG. 15 shows a change of the chip ID when low-priority processing image data packets 1311 and 1501 having chip ID=1 and job ID=10 are transferred to the processing unit 104 after function switching in the first and third embodiments. In the first embodiment, the image processing unit 104 whose function has switched to the FuncP, increments the chip ID from "1" to "2", and then transfers the image data packet to the subsequent stage. Even the image processing unit 105, whose function has switched to the FuncS, increments the chip ID. In contrast, in the third embodiment, the image processing unit 104, whose function has switched to the FuncP, rewrites the chip ID from "1" to "3". Thus, the image processing unit 105 directly transfers the image data packet to the subsequent stage, and the image processing unit 106 processes it. This can reduce the overhead including determination processing and chip ID increment processing in the image processing unit 105, increasing the throughput. This effect becomes significant when a larger number of image processing units are coupled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-111498, filed Apr. 30, 2009, which is hereby incorporated by reference herein in its entirety.

What is claimed is:

1. An image processing apparatus comprising:
    a plurality of image processing modules;
    wherein each of the plurality of image processing modules includes:
    an input unit configured to input packet data of a job containing image data and an identifier identifying an image processing module of the plurality of image processing modules, wherein the image processing module identified by the identifier is a target module of processing the image data;
    an image processing unit configured to, in a case where an image processing module which receives the packet data from the input unit is the target module, process the image data of the packet data, wherein the image processing unit has a plurality of functions including a function of processing the image data;
    an output unit configured to output packet data containing image data processed by the image processing unit;
    a switching unit configured to, in a case where the input unit inputs packet data of a high-priority job, switch a current function of the plurality of functions to a function of processing image data of the packet data of the high-priority job;
    a changing unit configured to, in a case where the switching unit switches the current function to the function of processing the image data of the packet data of the high-priority job and the input unit inputs packet data of a job different from the high-priority job, change an identifier of the packet data of the job to an identifier identifying another image processing module of the plurality of image processing modules, wherein the another image processing module includes the image processing unit whose current function corresponds to the current function from which the switching unit switched to the function of processing the image data of the packet data of the high-priority job; and
    a transfer unit configured to transfer the packet data whose identifier is changed by the changing unit to the another image processing module.

2. The apparatus according to claim 1, wherein the plurality of image processing modules execute image processing in parallel with each other.

3. The apparatus according to claim 1, wherein each of the plurality of image processing modules is configured with a reconfigurable circuit.

4. An image processing method in an image processing apparatus including a plurality of image processing modules, wherein each of the plurality of image processing modules performs the method comprising:
    an input step of inputting packet data of a job containing image data and an identifier identifying an image processing module of the plurality of image processing modules, wherein the image processing module identified by the identifier is a target module of processing the image data;
    an image processing step, performed by an image processing unit, of, in a case where an image processing module which receives the packet data from the input step is the target module, processing the image data of the packet data, wherein the image processing unit has a plurality of functions including a function of processing the image data;
    an output step of outputting packet data containing image data processed by the image processing unit in the image processing step;
    a switching step of, in a case where the input step inputs packet data of a high-priority job, switching a current function of the plurality of functions to a function of processing image data of the packet data of the high-priority job;
    a changing step of, in a case where the switching step switches the current function to the function of processing the image data of the packet data of the high-priority job and the input step inputs packet data of a job different from the high-priority job, changing an identifier of the packet data of the job to an identifier identifying another image processing module of the plurality of image processing modules, wherein the another image processing module includes the image processing unit whose current function corresponds to the current function from which the switching step switched to the function of processing the image data of the packet data of the high-priority job; and
    a transfer step of transferring the packet data whose identifier is changed by the changing step to the another image processing module.

* * * * *